(12) United States Patent
Joosten et al.

(10) Patent No.: US 8,997,549 B2
(45) Date of Patent: Apr. 7, 2015

(54) APPARATUS AND METHODS FOR AUTOMATICALLY TESTING A SERVO GAUGE IN AN INVENTORY MANAGEMENT SYSTEM

(75) Inventors: John Joosten, Liempde (NL); Paul De Bruin, Delft (NL)

(73) Assignee: Honeywell International Inc., Morristown, NJ (US)

( * ) Notice: Subject to any disclaimer, the term of this patent is extended or adjusted under 35 U.S.C. 154(b) by 570 days.

(21) Appl. No.: 12/889,148

(22) Filed: Sep. 23, 2010

(65) Prior Publication Data
US 2012/0073354 A1 Mar. 29, 2012

(51) Int. Cl.
*G01F 25/00* (2006.01)
*G01F 23/00* (2006.01)

(52) U.S. Cl.
CPC ........ *G01F 23/0023* (2013.01); *G01F 25/0061* (2013.01)

(58) Field of Classification Search
CPC .......................... G01F 23/0023; G01F 25/0061
USPC .......................................................... 73/1.73
See application file for complete search history.

(56) References Cited

U.S. PATENT DOCUMENTS

| | | | |
|---|---|---|---|
| 4,181,021 A | | 1/1980 | Harris et al. |
| 4,182,168 A | * | 1/1980 | Desch ........................ 73/862.49 |
| 4,527,107 A | * | 7/1985 | van der Pol et al. .......... 318/642 |
| 5,012,589 A | * | 5/1991 | Remion ........................... 33/720 |
| 5,027,526 A | | 7/1991 | Crane |
| 5,142,210 A | * | 8/1992 | Kojima et al. ................. 318/566 |
| 5,406,842 A | | 4/1995 | Locke |
| 5,442,359 A | | 8/1995 | Rubin |
| 5,774,089 A | | 6/1998 | Bamler et al. |
| 5,806,363 A | * | 9/1998 | Khoi et al. ....................... 73/313 |
| 6,202,487 B1 | | 3/2001 | Urias et al. |
| 6,629,458 B1 | | 10/2003 | Westerling et al. |
| 7,204,143 B1 | | 4/2007 | Nicewarner |
| 2003/0167839 A1 | | 9/2003 | Burger et al. |
| 2004/0196177 A1 | | 10/2004 | Billington et al. |

(Continued)

FOREIGN PATENT DOCUMENTS

| | | |
|---|---|---|
| DE | 100 40 180 A1 | 4/2002 |
| EP | 1775829 A2 * | 4/2007 |

(Continued)

OTHER PUBLICATIONS

Notification of Transmittal of the International Search Report and the Written Opinion of the International Searching Authority, or the Declaration dated Apr. 23, 2012 in connection with International Patent Application No. PCT/US2011/051582.

(Continued)

*Primary Examiner* — Hezron E Williams
*Assistant Examiner* — Nashmiya Fayyaz (57) ABSTRACT

A method includes initiating a test of a servo gauge by causing the servo gauge to attempt to move a displacer of the servo gauge, where the servo gauge uses a drum to move the displacer in a tank. The method also includes measuring a torque associated with the drum during or after the attempt to move the displacer and identifying a mechanical problem with the servo gauge based on the measured torque. For example, a stuck displacer can be identified when the measured torque exceeds an upper expected value. A lost displacer or a stuck drum can be identified when the measured torque is below a lower expected value.

20 Claims, 3 Drawing Sheets

(56) References Cited

U.S. PATENT DOCUMENTS

| | | |
|---|---|---|
| 2005/0190098 A1 | 9/2005 | Bridgelall et al. |
| 2009/0282892 A1 | 11/2009 | Sai |
| 2010/0037673 A1 | 2/2010 | Wicht et al. |
| 2010/0241369 A1 | 9/2010 | Wicht et al. |

FOREIGN PATENT DOCUMENTS

| | | |
|---|---|---|
| JP | 58-047219 | 3/1983 |
| JP | 60-073311 | 4/1985 |
| JP | 2236421 A | 9/1990 |
| NL | 1032192 | 7/2006 |
| WO | WO 8906346 A1 * | 7/1989 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/064421 A1 | 6/2008 |

OTHER PUBLICATIONS

International Standard, Petroleum and liquid petroleum products—Measurement of level and temperature in storage tanks by automatic methods, Part 3: Measurement of level in pressurized storage tanks (non-refrigerated), 1st Edition, Nov. 15, 2002, 21 pages.
"Servo Gauge 854ATG" Product Sheet, Enraf B.V., 4 pages.
"Level sensor", wikipedia.org, Aug. 2, 2008, 8 pages.
"HERMetic Sensor", Honeywell Enraf, 2007, 5 pages.
"Starrett Digitape 25", 4 pages.

\* cited by examiner

APPARATUS AND METHODS FOR AUTOMATICALLY TESTING A SERVO GAUGE IN AN INVENTORY MANAGEMENT SYSTEM

TECHNICAL FIELD

This disclosure relates generally to inventory management systems. More specifically, this disclosure relates to an apparatus and methods for automatically testing a servo gauge in an inventory management system.

BACKGROUND

Various facilities routinely include tanks for storing liquid and gas products. For example, storage tanks are routinely used in tank farms and oil, gas, and chemical storage facilities to store liquid and gas products. As another example, oil tankers and other liquid transport vessels routinely include numerous tanks storing oil or other products.

Oftentimes, it is necessary or desirable to measure the level of a product in a tank, such as during loading of a product into the tank or unloading of a product from the tank. For example, an overfill protection system is typically used to detect when a product is approaching the maximum safe fill level of a tank. Ideally, these measurements are used to stop the filling of the tank before the tank overflows or is damaged and the product escapes from the tank. Overfill protection systems often require extreme reliability and precise measurements of the product in a storage tank.

Among other approaches, radar gauges and servo gauges have been used to measure the product level in a tank. A radar gauge typically transmits radar signals towards a product in a tank and receives radar signals reflected off the surface of the product in the tank. Analysis of the reflected signals can be used to determine the product level in the tank. A servo gauge typically raises and lowers a displacer that sinks in the product within a tank. The servo gauge can determine the product level in the tank based on changes in the displacer's apparent weight, which changes depending on (among other things) whether the displacer is hanging in the air or submerged in the product.

SUMMARY

This disclosure provides an apparatus and methods for automatically testing a servo gauge in an inventory management system.

In a first embodiment, a method includes initiating a test of a servo gauge by causing the servo gauge to attempt to move a displacer of the servo gauge, where the servo gauge uses a drum to move the displacer in a tank. The method also includes measuring a torque associated with the drum during or after the attempt to move the displacer and identifying a mechanical problem with the servo gauge based on the measured torque.

In a second embodiment, an apparatus includes a drum configured to be rotated in order to raise and lower a displacer within a tank. The apparatus also includes a drive train configured to rotate the drum and a measuring unit configured to measure torque associated with the drum. The apparatus further includes a controller configured to (i) initiate a test of the apparatus by causing the drive train and drum to attempt to move the displacer and (ii) identify a mechanical problem with the apparatus based on the measured torque during or after the attempt to move the displacer.

In a third embodiment, a computer readable medium embodies a computer program. The computer program includes computer readable program code for initiating a test of a servo gauge by causing the servo gauge to attempt to move a displacer of the servo gauge, where the servo gauge is configured to use a drum to move the displacer in a tank. The computer program also includes computer readable program code for receiving measurements of a torque associated with the drum during or after the attempt to move the displacer. In addition, the computer program includes computer readable program code for identifying a mechanical problem with the servo gauge based on the measured torque.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
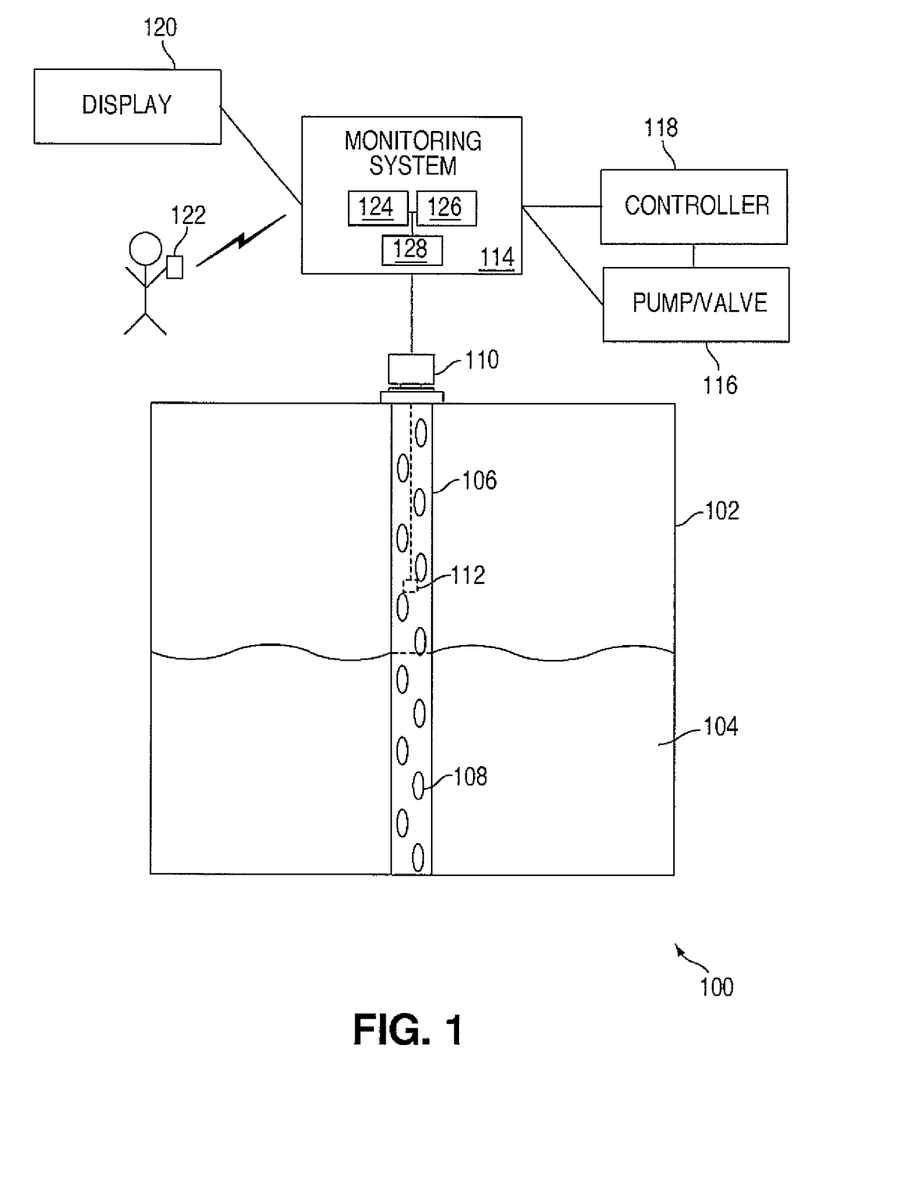
FIG. 1 illustrates an example inventory management system having a servo gauge according to this disclosure.

FIG. 1 illustrates an example inventory management system 100 having a servo gauge according to this disclosure. As shown in FIG. 1, the system 100 includes a tank 102 that can store one or more materials 104. The tank 102 represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

A stillpipe 106 having multiple openings 108 is used in conjunction with a servo gauge 110 to facilitate the measurement of the level of material 104 in the tank 102. The openings 108 represent holes, slots, or other apertures that allow material 104 to enter into and leave the stillpipe 106. The stillpipe 106 helps to provide a stable reference point for the servo gauge 110 to measure. For instance, the level of material 104 in the stillpipe 106 is generally equal to the level of material 104 outside the stillpipe 106, but the stillpipe 106 helps to reduce or prevent waves or other disturbances to the material 104 outside the stillpipe 106 from affecting level measurements taken inside the stillpipe 106 by the servo gauge 110. The stillpipe 106 includes any suitable structure for receiving material and allowing level measurements within the stillpipe. The stillpipe 106 can also be located at any suitable position. For instance, the stillpipe 106 could be attached to the tank's floor or to a lower portion of the tank's shell. Note, however, that the use of the stillpipe 106 is optional. The servo gauge 110 could operate inside the tank 102 in free space without being confined within a stillpipe.

The servo gauge 110 includes a displacer 112 that is physically raised and lowered within the tank 102. The displacer 112 can sink in the material 104 in the tank 102, and the apparent weight of the displacer 112 varies depending on whether the displacer 112 is completely or partially submerged and the type of material in which it is submerged. The servo gauge 110 can use the apparent weight of the displacer 112 to identify the level of material 104 in the tank 102. For example, the servo gauge 110 can raise and lower the displacer 112 using a wire or other connector wrapped around a drum, and the servo gauge 110 can measure the torque on the drum or a structure coupled to the drum (such as a shaft). The servo gauge 110 can use the measured torque to determine when the displacer 112 has become completely or partially submerged in the material 104, allowing the servo gauge 110 to determine the level of the material 104 in the tank 102. The servo gauge 110 includes any suitable structure for measuring a material level in a tank based on a displacer's apparent weight.

The determined level of material can be provided from the servo gauge 110 to a monitoring system 114 over a wired or wireless link. The monitoring system 114 can use the determined level of material from the servo gauge 110 in any suitable manner. For example, the monitoring system 114 could control automatic loading or unloading of material in the tank 102 by controlling a pump or valve 116 or by providing the determined level to an external controller 118 that controls the pump or valve 116. The monitoring system 114 could also notify personnel responsible for controlling the loading or unloading of the tank 102, such as by displaying the determined level on a display 120 or by transmitting the determined level to a wireless or other user device 122. The monitoring system 114 could further trigger any suitable alarm when, as discussed below, the servo gauge 110 detects a mechanical failure of one or more components of the servo gauge 110.

The monitoring system 114 could represent any suitable computing or processing system or device, such as a computing device, a process controller, or other system or device. In particular embodiments, the monitoring system 114 includes at least one processing unit 124 and at least one memory 126 storing instructions and data used, generated, or collected by at least one processing unit 124. The monitoring system 114 can also include at least one interface 128 facilitating communication with external devices or systems like the components 110 and 116-122, such as an Ethernet interface, a radio frequency (RF) transceiver, or other wired or wireless interface.

It may be necessary or desirable to test the servo gauge 110 to ensure that the servo gauge 110 is not experiencing a mechanical fault. This may be required, for example, to ensure that the servo gauge 110 is operating properly so that overfill protection can be provided. A mechanical failure in the servo gauge 110 during loading of the tank 102 could prevent an overfill protection system from identifying a dangerous condition.

One mechanical failure mode of the servo gauge 110 is that the displacer 112 can become physically stuck in the tank 102. The displacer 112 could get stuck, for instance, in an opening 108 of the stillpipe 106, in sludge or other solidified material in the tank 102, or on an obstruction in the tank 102 (such as a hatch or ladder). In this case, the material 104 could rise above or fall below the displacer 112, and the servo gauge 110 is unable to detect that change. Other mechanical failure modes of the servo gauge 110 are that the displacer 112 can separate from the servo gauge 110 or the drum of the servo gauge 110 can get stuck. Again, in those cases, the servo gauge 110 is unable to accurately measure the level of material 104 in the tank 102.

In accordance with this disclosure, the servo gauge 110 implements an automatic testing feature. At certain times (such as periodically or when the servo gauge detects less than a threshold amount of change in the material level for a threshold amount of time), the servo gauge 110 attempts to raise and/or lower the displacer 112. If none of these or other failure modes is present, the servo gauge 110 detects expected changes in the torque associated with the displacer 112. For instance, the servo gauge 110 could detect increased (but not excessively high) torque when the displacer 112 is raised, and the servo gauge 110 could detect decreased (but not excessively low) torque when the displacer 112 is lowered. If no problems are detected, the displacer 112 could be returned to its pre-test position after the test, although care can be taken when the tank 102 is being filled or emptied (such as by returning the displacer 112 to a higher position when the tank is being filled and to a lower position when the tank is being emptied).

If the displacer 112 gets stuck, attempting to raise the displacer 112 could create higher-than-expected torque on the drum of the servo gauge 110, or attempting to lower the displacer 112 could create lower-than-expected torque on the drum of the servo gauge 110. Either condition can be detected by the servo gauge 110. If the displacer 112 is lost or the drum is stuck, attempting to raise the displacer 112 could create smaller-than-expected torque on the drum of the servo gauge 110, which again can be detected by the servo gauge 110. If any of these conditions is detected by the servo gauge 110, the servo gauge 110 can take corrective action. Example corrective action includes causing the processing system 114 to sound an alarm, stop the pumping of material 104 into or out of the tank 102, or close a valve controlling the flow of material 104 into or out of the tank 102 (or a combination of these).

In this way, the servo gauge 110 can automatically test itself to determine if different mechanical faults are present with the servo gauge 110. This increases the reliability of the servo gauge 110 and can improve the safety and reliability of overfill protection systems or other systems that operate using the servo gauge 110. Additional details regarding this automatic testing functionality are provided below.

Although FIG. 1 illustrates one example of an inventory management system 100 having a servo gauge 110, various changes may be made to FIG. 1. For example, a system could include any number of tanks, tank monitoring systems, servo gauges, processing systems, pumps, valves, controllers, displays, and user devices. Also, the makeup and arrangement of the inventory management system 100 are for illustration only. Components could be added, omitted, combined, subdivided, or placed in any other suitable configuration according to particular needs. In addition, FIG. 1 illustrates one operational environment in which servo gauge testing functionality can be used. This functionality could be used in any other suitable system.

Figure 2:
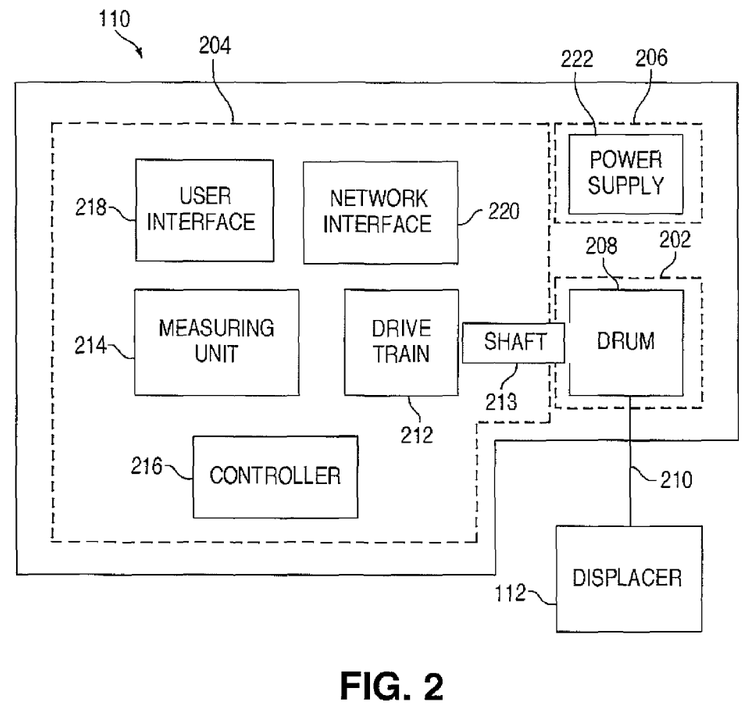
FIGS. 2 and 3 illustrate example servo gauges for use in an inventory management system according to this disclosure.
Figure 3:
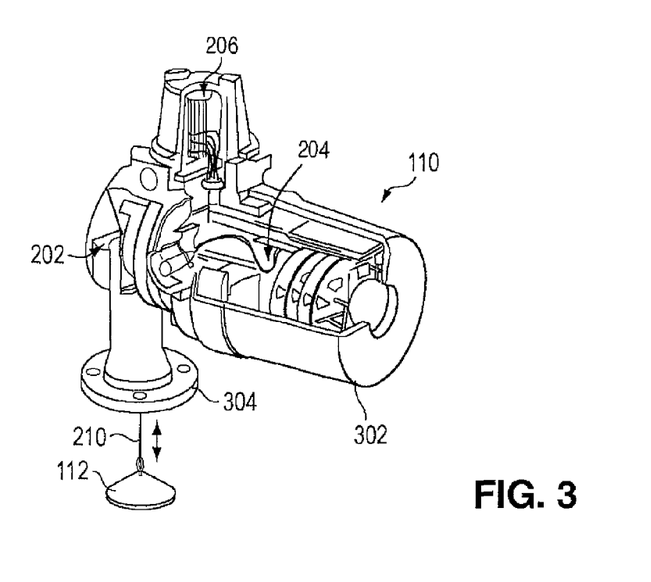

FIGS. 2 and 3 illustrate example servo gauges 110 for use in an inventory management system according to this disclosure. As shown in FIG. 2, one embodiment of the servo gauge 110 includes three compartments: a drum compartment 202, a drive compartment 204, and a power supply compartment 206. The drum compartment 202 includes a drum 208 on which a wire, tape, or other connector 210 is wound. The drum 208 can be rotated in one direction by the drive compartment 204 to lower the displacer 112, and the drum 208 can be rotated in another direction by the drive compartment 204 to raise the displacer 112. The drum 208 includes any suitable structure for raising and lowering a displacer via rotation, such as a cylindrical-shaped object.

The drive compartment 204 includes a drive train 212, which imparts rotation to the drum 208 via a shaft 213. For example, the drive train 212 or shaft 213 could generate a magnetic field, and magnet coupling can be used to convey torque between the shaft 213 and the drum 208. In these embodiments, no direct connection may be needed between the drum compartment 202 and the other compartments 204-206. However, other techniques for causing rotation of the drum 208 could be used, such as when the shaft 213 is physically connected to the drum 208. The drive train 212 includes any suitable structure for imparting rotation to a drum. In particular embodiments, the drive train 212 includes a stepper motor that causes the drum 208 to rotate in specified steps, meaning the drum 208 does not rotate freely but in defined amounts or "steps." Each step of the stepper motor should therefore impart a known amount of rotation to the drum 208. In these embodiments, since the drum 208 has a known diameter or circumference, the length of connector 210 that is dispensed or collected during a single step rotation can be known with a high degree of certainty.

The drive compartment 204 also includes a measuring unit 214, which identifies the torque induced on the drum 208 by the displacer 112. The torque induced on the drum 208 can be caused by the weight of the displacer 112. When the displacer 112 is dangling from the connector 210, the measured torque is higher. When the displacer 112 is completely or partially submerged in the material 104, the measured torque is lower. The measuring unit 214 includes any suitable structure for measuring at least one characteristic of the servo gauge 110. As a particular example, the measuring unit 214 could identify the torque on the drum 208 by measuring the torque on the shaft 213.

A controller 216 uses the measured torques from the measuring unit 214 to (among other things) detect a mechanical fault with the servo gauge 110. The controller 216 can also use the measured torques to determine the level of material 104 in the tank 102. For example, the controller 216 can cause the drive train 212 to lower the displacer 112 in steps. When the displacer 112 is completely or partially submerged, the controller 216 detects the lower torque measurements from the measuring unit 214. Since the controller 216 can track the number of step rotations of the drum 208 and knows the length of connector 210 dispensed or collected during each step rotation, the controller 210 can identify the length of the connector 210 that is between the drum 208 and the displacer 112 when the drop in torque is detected. That length can be used to identify the level of material 104 in the tank 102.

The controller 216 can output the identified level as the current level of material in the tank 102 until a threshold change in torque is detected by the measuring unit 214. The change in torque could be an increase caused by a lower material level (so the displacer 112 is no longer partially submerged) or a decrease caused by a higher material level (so the displacer 112 is more submerged). At this point, the drive train 212 can induce rotation of the drum 208 to reposition the displacer 112, and the controller 216 can determine a new material level in the tank 102.

The controller 216 can also initiate testing of the servo gauge 110 and can use the torque measurements to identify mechanical faults as described below. Note that while torque measurements can be used to detect a mechanical fault, other techniques could be used to determine the level of material in the tank 102, such as reading distance values off a tape forming the connector 210.

The controller 216 includes any suitable structure for determining a level of material in a tank and identifying mechanical faults. As particular examples, the controller 216 could represent a processor, microprocessor, microcontroller, field programmable gate array, digital signal processor, or other processing or control device.

In this example, the drive compartment 204 further includes a user interface 218 and a network interface 220. The user interface 218 facilitates communication between the servo gauge 110 and an operator or other personnel. The user interface 218 could provide data from an operator to the controller 216, such as a command to initiate level measurements, a command to raise or lower the displacer 112, or a command to enable or disable testing of the servo gauge 110. The user interface 218 could also allow the personnel to review measurement data generated by the servo gauge 110. The user interface 218 includes any suitable interface for interacting with one or more users, such as a keypad or keyboard and a display.

The network interface 220 facilitates the communication of data to or from the servo gauge 110. For example, the network interface 220 could receive level measurements calculated by the servo gauge 110 and transmit the level measurements to one or more external destinations (such as the monitoring system 114). The network interface 220 includes any suitable structure supporting wired or wireless communications, such as an Ethernet interface, an RF transceiver, or other wired or wireless interface.

The power supply compartment 206 includes a power supply 222, which provides operating power for the servo gauge 110. The power supply 222 could provide power to various components of the drive compartment 204. Depending on the implementation, the power supply 222 may or may not supply power to the drum compartment 202. The power supply 222 includes any suitable structure for providing power, such as a battery, fuel cell, or solar cell.

FIG. 3 illustrates a specific implementation of the servo gauge 110 of FIG. 2. As shown in FIG. 3, the servo gauge 110 includes a housing 302 that encases electrical and other components of the servo gauge 110. A portion of the housing 302 is cut away in FIG. 3 to show the internal components of the servo gauge 110. The servo gauge 110 also includes a flange 304, which secures the servo gauge 110 to a tank 102. An opening through the tank 102 is accessible through the flange 304 so that the displacer 112 and the connector 210 can enter the tank 102.

As noted above, various failure modes exist in the servo gauge 110, such as a stuck or lost displacer 112 or a stuck drum 208. The controller 216 can initiate mechanical testing of the servo gauge 110 by causing the drive train 212 to attempt to raise and/or lower the displacer 112 by a specified amount. Assuming there are no faults, raising the displacer 112 causes the displacer 112 to leave the material 104 and hang in the air, which causes an expected increase in torque on the drum 208. Similarly, assuming there are no faults, lowering the displacer 112 causes the displacer 112 to become more submerged in the material 104, which causes an expected decrease in torque on the drum 208. The controller 216 could determine that no mechanical faults are present based on the torque measurements from the measuring unit 214.

Attempting to raise a stuck displacer 112 can cause higher-than-expected torque on the drum 208, or attempting to lower a stuck displacer 112 can cause lower-than-expected torque on the drum 208. Attempting to raise or lower a lost displacer 112 causes lower-than-expected changes in torque on the drum 208. Similarly, a failure of the drum 208 to rotate would cause lower-than-expected changes in torque on the drum 208. In these cases, the controller 216 could detect a problem based on the torque measurements from the measuring unit 214 and take corrective action.

Although FIGS. 2 and 3 illustrate examples of servo gauges 110 for use in an inventory management system, various changes may be made to FIGS. 2 and 3. For example, the functional division shown in FIG. 2 is for illustration only. Components could be added, omitted, combined, subdivided, or placed in any other suitable configuration according to particular needs. As a particular example, the functionality of the measuring unit 214 and the controller 216 could be combined into a single processing or other functional unit. Also, the structure of the servo gauge 110 shown in FIG. 3 is for illustration only.

Figure 4:
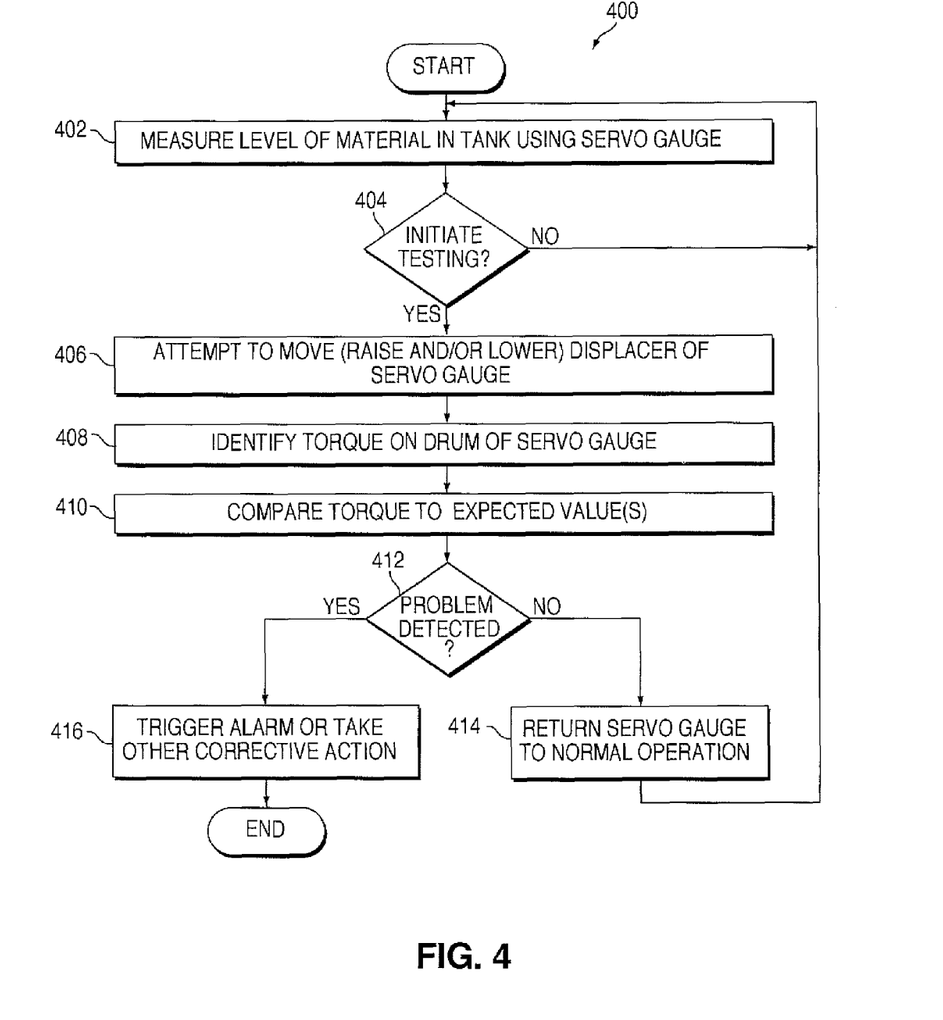
FIG. 4 illustrates an example method for automatically testing a servo gauge in an inventory management system according to this disclosure.

FIG. 4 illustrates an example method 400 for automatically testing a servo gauge in an inventory management system according to this disclosure. As shown in FIG. 4, a level of material in a tank is measured using a servo gauge at step 402. This could include, for example, the servo gauge 110 operating to lower the displacer 112 within a stillpipe 106 to capture one or more level measurements. The servo gauge 110 could capture the level measurements automatically or in response to external commands. During this time, the servo gauge 110 can cause the drum 208 to rotate in one or more directions until the displacer 112 is partially submerged in the material 104. This condition can be detected by measuring the torque on the drum 208, either directly or indirectly (such as via torque measurements of the shaft 213), and the amount of wire 210 dispensed by the drum 208 to reach this condition can be used to determine a level measurement. However, at some point, the displacer 112 may become stuck or lost, the drum 208 may get stuck, or some other mechanical fault may occur.

The servo gauge determines whether it should initiate testing at step 404. This could include, for example, the controller 216 determining whether the measured level of material 104 in the tank 102 has remained constant or substantially constant (such as measurements within a threshold amount or percentage of each other) for a threshold period of time. The threshold period of time could be any suitable value, such as one minute or some other user-programmable amount of time. The selection of the threshold period of time may be based on the particular installation being monitored, such as the rate at which material can rise or fall in the tank 102. If the testing is not performed frequently enough, a fault might not be detected in time. Conversely, the testing cannot be performed excessively as this would interfere with the correct functioning of the gauge 110 or cause annoyances for operators in a control room.

Note that the testing can be done regardless of whether a tank 102 is currently being filled or emptied. When the tank 102 is not being filled or emptied, the testing could occur at a larger interval than when the tank 102 is being filled or emptied. When the tank 102 is being filled, the testing could occur until the material level reaches a specified point, such as the "topping off" point where the last one or two meters of the tank 102 are filled. Testing during topping off may be undesirable if it interrupts level monitoring during this critical time. If testing is not initiated, the process returns to step 402 to continue measuring the level of material 104 in the tank 102.

When testing is initiated, the servo gauge attempts to move (raise and/or lower) the displacer of the servo gauge at step 406. This could include, for example, the drive train 212 attempting to rotate the drum 208 a specified number of steps to raise or lower the displacer 112. The testing could involve both raising and lowering the displacer 112. When both are to be done, the servo gauge could use the prior movement of the material level to determine which operation (raise or lower) to perform first. For example, if the material level was rising before it became stable enough to trigger testing, the servo gauge could first attempt to raise the displacer 112. During or after each attempt to raise or lower the displacer, torque on the drum of the servo gauge is identified at step 408. This could include, for example, the measuring unit 214 measuring the torque on the drum 208 or the shaft 213.

The measured torque(s) is/are compared to at least one expected value at step 410. This could include, for example, the controller 216 comparing a measured torque against an upper threshold value. The upper threshold value could designate the torque above which it is assumed that the displacer 112 has gotten stuck, and the attempt to raise the stuck displacer 112 causes increased torque on the drum 208. When the measured torque increases but does not exceed the upper threshold, value, it can be assumed that the increased torque is caused by the displacer 112 having been successfully raised out of the material 104. This could also include the controller 216 comparing the measured torque against a lower threshold value. The lower threshold value could designate the torque below which it is assumed that the displacer 112 has been lost or the drum 208 has gotten stuck, and the torque expected from raising the displacer 112 out of the material 104 has not appeared. The expected value could also represent an expected change in torque, such as the change expected when lowering the displacer 112 from a partially submerged condition to a completely submerged condition.

If a problem is not detected at step 412, the displacer has presumably been successfully raised and/or lowered by the servo gauge, and the servo gauge returns to normal operation at step 414. This could include, for example, the servo gauge 110 causing the drum 208 to raise or lower the displacer 112 until the servo gauge 110 again detects that the displacer 112 has contacted the material 104. At this point, the method returns to step 402 to continue measuring the level of material 104 in the tank 102.

If a problem is detected, the servo gauge triggers an alarm or takes other corrective action at step 416. This could include, for example, the servo gauge 110 notifying the monitoring system 114 to shut down a pump or valve 116 or notify a controller 118 that the pump or valve 116 should be shut down. This could also include the servo gauge 110 notifying the monitoring system 114 to transmit an alert for presentation on a display 120 or a user device 122. The servo gauge 110 could also perform these functions itself rather than relying on the monitoring system 114 to do so. Any other or additional corrective action could also occur.

In this way, the servo gauge 110 can test itself to help identify mechanical faults with the components of the servo gauge 110. This testing can be done independently of higher-level systems. This testing can also help to reduce or eliminate the possibility that one or more mechanical failures are not detected and reported. Note that alarms related to the level of the material 104 in the tank 102 may not be triggered during testing of the servo gauge 110. This may prevent, for example, "too low" or "too high" alarms from being triggered when the displacer 112 is raised and lowered.

Although FIG. 4 illustrates one example of a method 400 for automatically testing a servo gauge in an inventory management system, various changes may be made to FIG. 4. For example, while shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

In particular embodiments, the servo gauge testing functionality can be implemented using a computer program executed on a platform associated with one or multiple servo gauges. The computer program could be highly customizable. For instance, configuration options could include which servo gauges are tested, the expected torque values or torque change values to be used during testing, the amount of time stable measurements are needed before testing is initiated, and the amount of time between tests. Other configuration options could include which direction (raise or lower) is tested first during a test, the amount of displacer movement needed to assume the displacer is not stuck, and the maximum amount of time to be spent during a test attempting to move the displacer. The computer program can raise an alarm whenever a problem with a servo gauge is detected and whenever it is unable to test a servo gauge (such as due to a loss of communication). Events associated with the computer program can be logged. The events can include starting or stopping of the computer program, actions taken during testing, alarms raised by the computer program, and enabling or disabling of testing for each tank (disabling could be done, for instance, when maintenance is being performed on a tank). The computer program could provide operators with a window (such as an always-on-top window) identifying its status and any alarms. Configuration data for the computer program could be stored in a dedicated file, and the computer program could be started automatically (such as when another program like ENTIS PRO from HONEYWELL INTERNATIONAL INC. starts).

It may be advantageous to set forth definitions of certain words and phrases used throughout this patent document. The term "couple" and its derivatives refer to any direct or indirect communication between two or more elements, whether or not those elements are in physical contact with one another. The term "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying, over a period of time, a change that is less than a threshold amount to a level of a displacer of a servo gauge in a tank;
   responsive to identifying the change that is less than the threshold amount and based on whether a measured level of material in the tank has remained constant or substantially constant for a specified period of time, automatically initiating a test of the servo gauge by causing the servo gauge to attempt to move the displacer of the servo gauge, the servo gauge using a drum to move the displacer in the tank;
   measuring a torque on the drum by measuring the torque on a shaft that imparts rotation to the drum during or after the attempt to move the displacer; and
   identifying a mechanical problem with the servo gauge based on the measured torque on the shaft, the mechanical problem including a mechanical failure of one or more components of the servo gauge.

2. The method of claim 1, wherein identifying the mechanical problem with the servo gauge comprises:
   comparing the measured torque to an upper expected value; and
   identifying the mechanical problem when the measured torque exceeds the upper expected value.

3. The method of claim 1, wherein identifying the mechanical problem with the servo gauge comprises:
   comparing the measured torque to a lower expected value; and
   identifying the mechanical problem when the measured torque is below the lower expected value.

4. The method of claim 1, wherein identifying the mechanical problem with the servo gauge comprises:
   identifying a change in torque between two torque measurements; and
   identifying the mechanical problem when the change in torque is below an expected value.

5. The method of claim 1, wherein:
   causing the servo gauge to attempt to move the displacer comprises causing the servo gauge to attempt to raise and lower the displacer; and
   the method further comprises using prior changes in the measured level of material to select one of: (i) causing the servo gauge to attempt to raise and then lower the displacer and (ii) causing the servo gauge to attempt to lower and then raise the displacer.

6. An apparatus comprising:
   a drum configured to be rotated in order to raise and lower a displacer within a tank;
   a drive train configured to rotate the drum;
   a measuring unit configured to measure torque on the drum by measuring the torque on a shaft that imparts rotation to the drum; and
   a controller configured to:

identify, over a period of time, a change to a level of the displacer that is less than a threshold amount;

responsive to an identification of the change that is less than the threshold amount and based on whether a measured level of material in the tank has remained constant or substantially constant for a specified period of time, automatically initiate a test of the apparatus by causing the drive train and drum to attempt to move the displacer; and identify a mechanical problem with the apparatus based on the measured torque on the shaft during or after the attempt to move the displacer.

7. The apparatus of claim 6, wherein:
the controller is configured to compare the measured torque to an upper expected value; and
the controller is configured to identify the mechanical problem when the measured torque exceeds the upper expected value.

8. The apparatus of claim 6, wherein:
the controller is configured to compare the measured torque to a lower expected value; and
the controller is configured to identify the mechanical problem when the measured torque is below the lower expected value.

9. The apparatus of claim 6, wherein:
the controller is configured to identify a change in torque between two torque measurements; and
the controller is configured to identify the mechanical problem when the change in torque is below an expected value.

10. The apparatus of claim 6, wherein:
the controller is further configured to take corrective action in response to the identification of the mechanical problem, and
the corrective action includes at least one of:
causing an alarm to sound,
stopping pumping of material into the tank,
stopping pumping of material out of the tank, and
closing a valve that controls flow of material into or out of the tank.

11. The apparatus of claim 6, wherein the measuring unit and the controller are integrated into a single functional unit.

12. A non-transitory computer readable medium embodying a computer program, the computer program comprising computer readable program code for:
identifying, over a period of time, a change that is less than a threshold amount to a level of a displacer of a servo gauge in a tank;
responsive to identifying the change that is less than the threshold amount and based on whether a measured level of material in the tank has remained constant or substantially constant for a specified period of time, automatically initiating a test of the servo gauge by causing the servo gauge to attempt to move the displacer of the servo gauge, the servo gauge configured to use a drum to move the displacer in a tank;

receiving measurements of a torque on the drum by measuring the torque on a shaft that imparts rotation to the drum; and identifying a mechanical problem with the servo gauge based on the measured torque on the shaft, the mechanical problem including a mechanical failure of one or more components of the servo gauge.

13. The computer readable medium of claim 12, wherein the computer readable program code for identifying the mechanical problem with the servo gauge comprises computer readable program code for:
comparing the measured torque to an upper expected value; and
identifying the mechanical problem when the measured torque exceeds the upper expected value.

14. The computer readable medium of claim 12, wherein the computer readable program code for identifying the mechanical problem with the servo gauge comprises computer readable program code for:
comparing the measured torque to a lower expected value; and
identifying the mechanical problem when the measured torque is below the lower expected value.

15. The computer readable medium of claim 12, wherein the computer readable program code for identifying the mechanical problem with the servo gauge comprises computer readable program code for:
identifying a change in torque between two torque measurements; and
identifying the mechanical problem when the change in torque is below an expected value.

16. The computer readable medium of claim 12, further comprising computer readable program code for:
determining a level of material in a tank using the servo gauge.

17. The method of claim 1, wherein the displacer is lowered within a stillpipe within the tank to capture one or more level measurements of material in the tank.

18. The method of claim 1, wherein the mechanical problem includes one or more of:
the displacer becoming physically stuck in the tank;
the displacer separating from the servo gauge; and
the drum of the servo gauge getting stuck.

19. The method of claim 1, wherein one of:
the attempt to move the displacer is an attempt to raise the displacer that causes a higher-than-expected torque on the drum and indicates the displacer is stuck;
the attempt to move the displacer is an attempt to lower the displacer that causes a lower-than-expected torque on the drum and indicates the displacer is stuck; and
the attempt to move the displacer causes a lower-than-expected change in torque on the drum and indicates one or more of the displacer is lost and the drum has failed.

20. The method of claim 17, wherein the stillpipe comprises a plurality of openings.

* * * * *